(12) United States Patent
Hsu

(10) Patent No.: US 7,227,100 B2
(45) Date of Patent: Jun. 5, 2007

(54) WARMER FOR WARMING WIPER AND FLUID CONTAINER SIMULTANEOUSLY OR ALTERNATIVELY

(76) Inventor: Tsang-Hung Hsu, 14 Floor, No. 632, Ta-Yu Road, Taoyuan City (TW)

( * ) Notice: Subject to any disclaimer, the term of this patent is extended or adjusted under 35 U.S.C. 154(b) by 450 days.

(21) Appl. No.: 10/966,798

(22) Filed: Oct. 18, 2004

(65) Prior Publication Data

US 2007/0084846 A1    Apr. 19, 2007

(51) Int. Cl.
*A47G 36/26* (2006.01)

(52) U.S. Cl. ............. 219/386; 219/387; 219/521; 219/522; 219/523; 219/524; 219/525; 219/433; 219/214; 219/209; 219/429; 219/528; 219/385

(58) Field of Classification Search ........ 219/385–387, 219/521–525, 533, 214, 209, 433, 429, 528; 126/263.01, 261, 265
See application file for complete search history.

(56) References Cited

U.S. PATENT DOCUMENTS 6,528,766 B1 *  3/2003  Parks et al. ................ 219/386

* cited by examiner

*Primary Examiner*—Shawntina Fuqua

(57) ABSTRACT

A warmer includes: a main casing adapted for storing a wiper box therein; a drawer casing slidably engaged in the main casing and operatively withdrawn outwardly for storing a fluid container including nursing bottle or beverage cup in the drawer casing; and a heating device provided in the casing for warming a wet tissue or wiper in the wiper box stored in the main casing and for warming the fluid container in the drawer casing; whereby when the warming of the fluid container is unnecessary, the drawer casing may be pushed inwardly into the main casing just for warming the wiper box only and also for saving the volume of the complete warmer device.

16 Claims, 6 Drawing Sheets

US 7,227,100 B2

WARMER FOR WARMING WIPER AND FLUID CONTAINER SIMULTANEOUSLY OR ALTERNATIVELY

BACKGROUND OF THE INVENTION

U.S. Pat. No. 6,331,696 to Nakamura et al. disclosed a wet tissue warmer. This prior art may only warm the wet tissue. It can not play double roles for simultaneously warming tissue and a liquid container such as a nursing bottle.

The present inventor has found the shortcomings of the prior art and invented the present warmer for warming wiper and fluid container simultaneously or alternatively.

SUMMARY OF THE INVENTION

The object of the present invention is to provide a warmer including: a main casing adapted for storing a wiper box therein; a drawer casing slidably engaged in the main casing and operatively withdrawn outwardly for storing a fluid container including nursing bottle or beverage cup in the drawer casing; and a heating device provided in the casing for warming a wet tissue or wiper in the wiper box stored in the main casing and for warming the fluid container in the drawer casing; whereby when the warming of the fluid container is unnecessary, the drawer casing may be pushed inwardly into the main casing just for warming the wiper box only and also for saving the volume of the complete warmer device.

DETAILED DESCRIPTION

Figure 1:
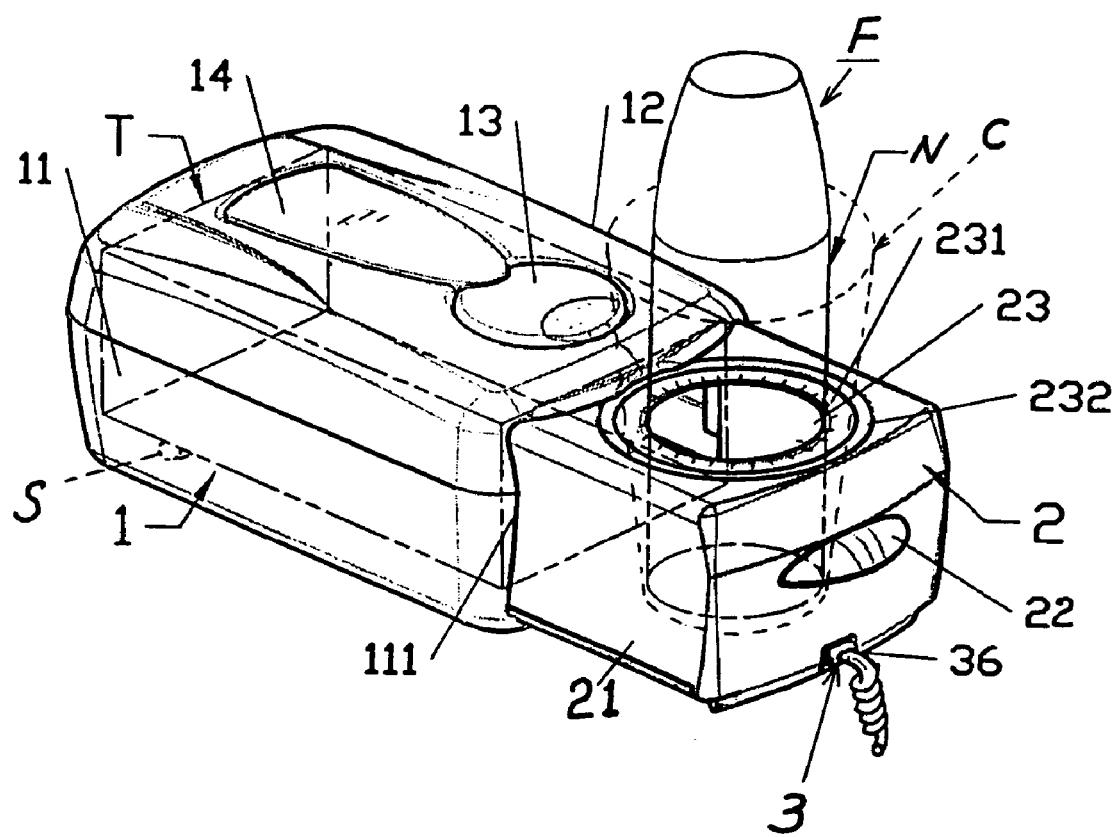
FIG. 1 is a perspective view of the present invention.

As shown in the drawing figures, a preferred embodiment of the warmer of the present invention comprises: a main casing 1, a drawing casing 2 slidably engaged with the main casing 1, and a heating device 3 formed under the drawer casing 2 for warming material or container stored in the main casing 1 and in the drawer casing 2.

The main casing 1 is provided for storing a wiper (or wet wiper) box such as a tissue box T or a baby wiper box or other thin pieces in the casing 1; while the drawer casing 2 provided for storing a fluid container such as a nursing bottle N or beverage cup C in the drawer casing 2.

Either casing 1 or 2 may be made of plastic materials, but not limited, in accordance with the present invention. The shapes of the casing 1, 2 may also be modified to be different from the parallelepiped as shown in the drawing figures, not limited in this invention.

The main casing 1 includes: a lower shell 11 slidably engaged with the drawer casing 2, an upper cover 12 pivotally secured to the lower shell 11 for combinably forming the main casing 1, a wiper cover 14 pivotally secured to the upper cover 11 for normally closing the wiper cover 14, and an actuator 13 formed on the upper cover 12 and operatively depressed for opening the wiper cover 14.

Naturally, the actuator 13 may also be eliminated in this invention, and the wiper cover 14 will then be modified to have locking and unlocking mechanism provided therein (not shown) so that the wiper cover 14 will then be directly closed on or opened from the upper cover 12 of the present invention.

The lower shell 11 includes: a trough 111 recessed in the lower shell 11 for slidably engaging the drawer casing 2 in the trough 111, a pair of guiding projections 112 formed on opposite side walls of the lower shell for slidably engaging a pair of guiding grooves 211 recessed in opposite outer walls of the drawer casing 2, and a pair of pivots 113 formed on a rear wall of the lower shell for pivotally securing the upper cover 12 on the lower shell 11.

Figure 3:
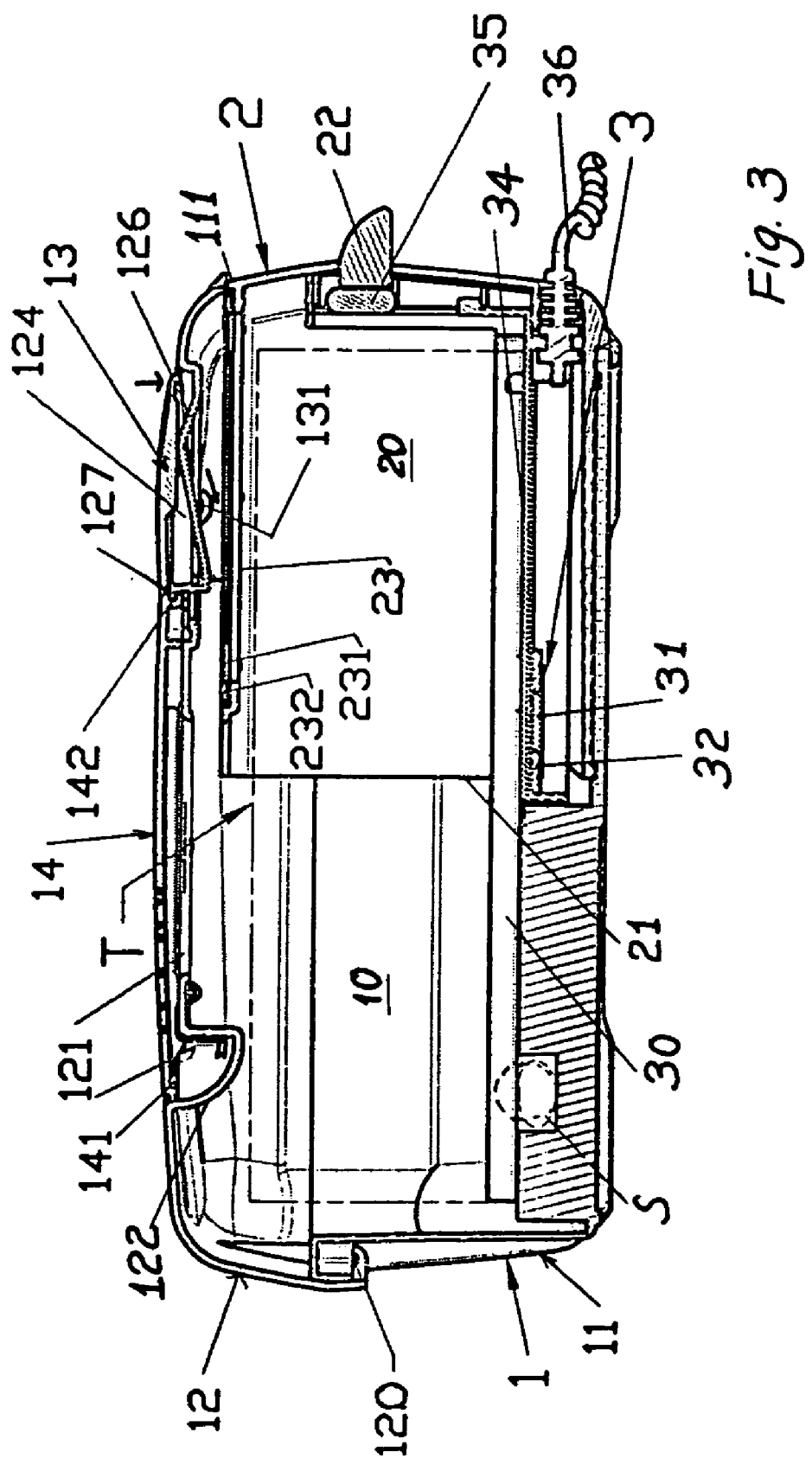
FIG. 3 is a sectional drawing of the present invention wherein the outwardly withdrawn drawing casing is shown as dotted line.
Figure 4:
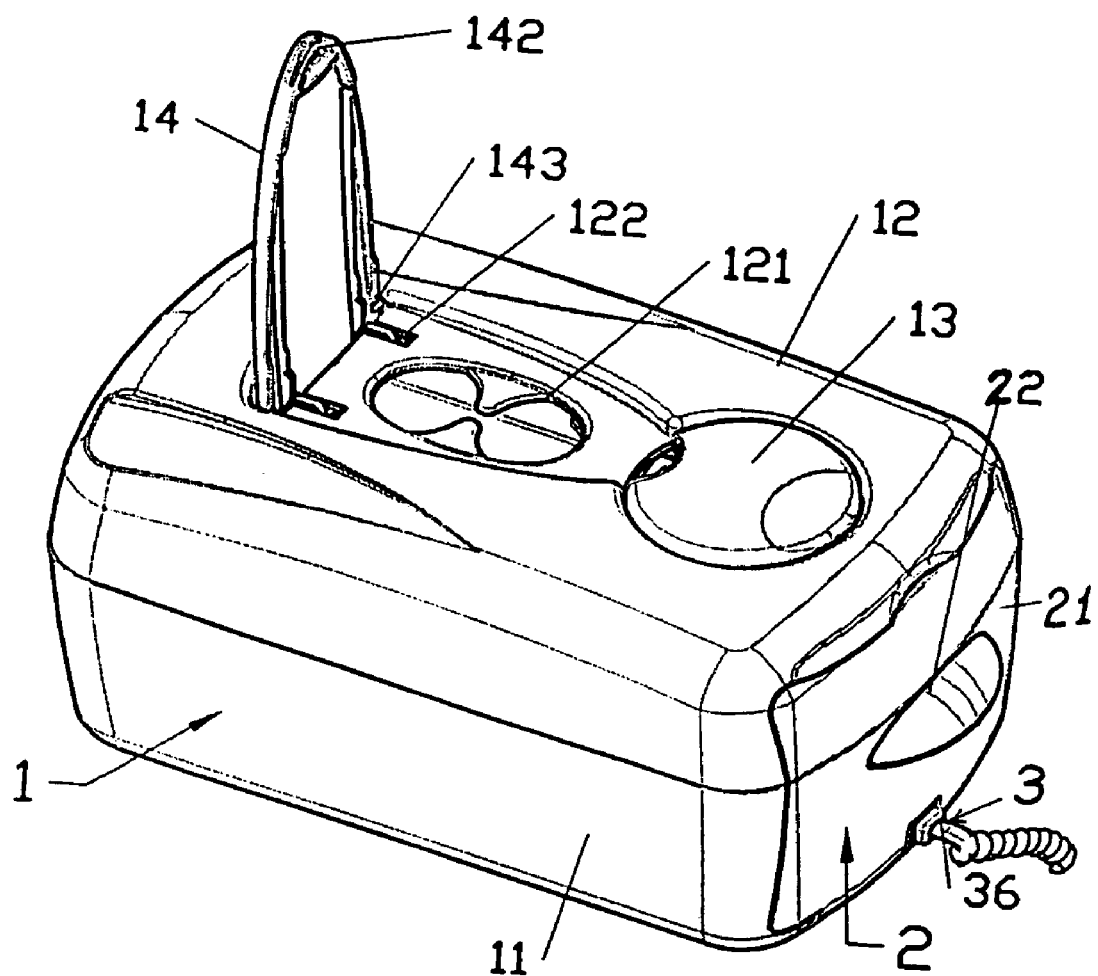
FIG. 4 shows the present invention having its wiper cover opened for pick-up of tissue.

The main casing 1 defines an interior 10 therein and the drawer casing 2 defines a drawer interior 20 in the casing 2 to cooperatively store the wiper box T (such as tissue box) in the interiors 10, 20 for warming the wiper or tissue when the drawer casing 2 is retracted into the main casing 1 such as shown in FIG. 3.

The upper cover 12 includes: a pair of pivot holes 120 formed in a rear portion of the upper cover 12 to be pivotally engaged with pivots 113 formed on the lower shell 11 for pivotally securing the upper cover 12 to the lower shell 11; a wiper opening 121 formed through the upper cover 12 for pick up of wiper or tissue from the wiper box T stored in the casing 1, 2; a wiper cover 14 pivotally secured on the upper cover 12 for normally closing the wiper opening 121; and an actuator 13 formed on the upper cover 12 for operatively opening the wiper cover 14 when it is intended to pick up wiper or tissue from interior 10, 20 in the casing 1, 2.

Figure 5:
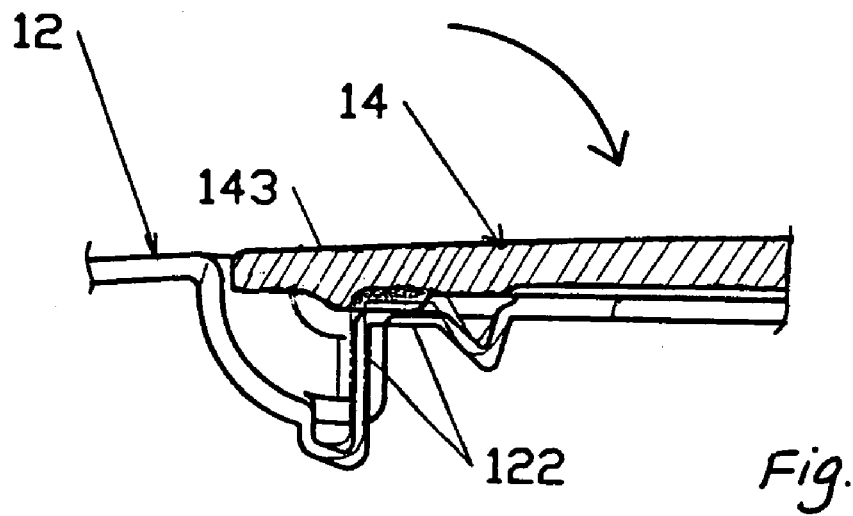
FIG. 5 shows a closed wiper cover of the present invention.
Figure 6:
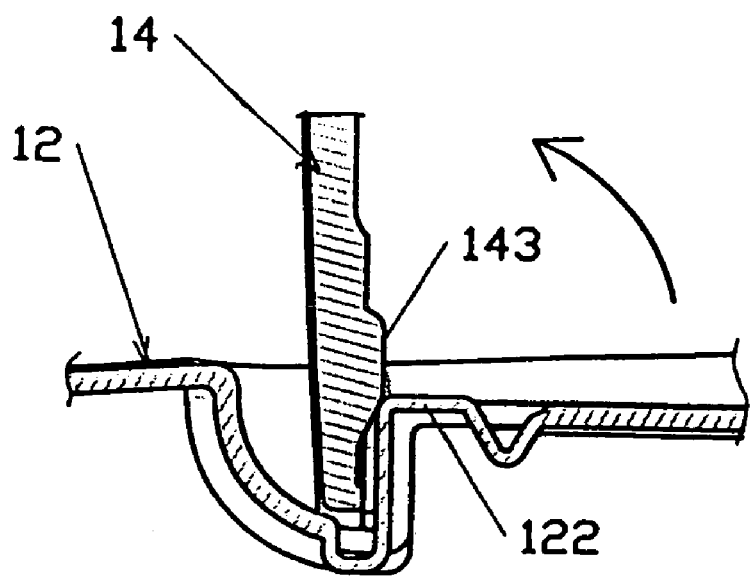
FIG. 6 shows an opened wiper cover from FIG. 5.
Figure 7:
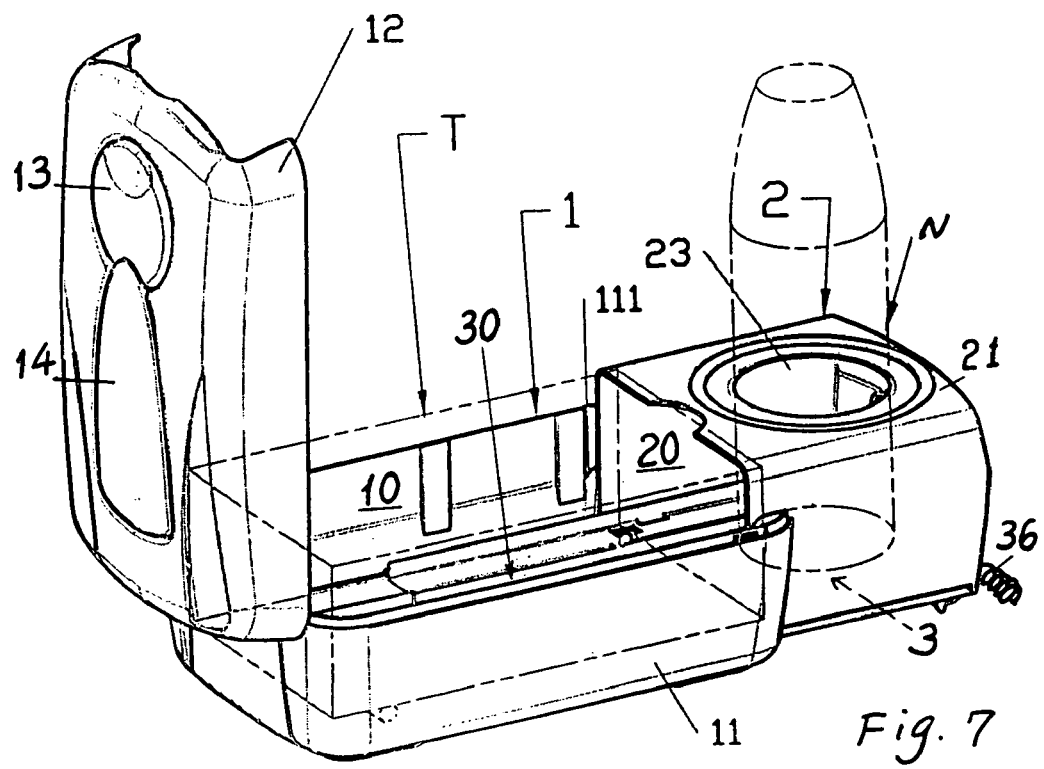
FIG. 7 shows the present invention with its upper cover opened and the drawer casing outwardly withdrawn.
Figure 8:
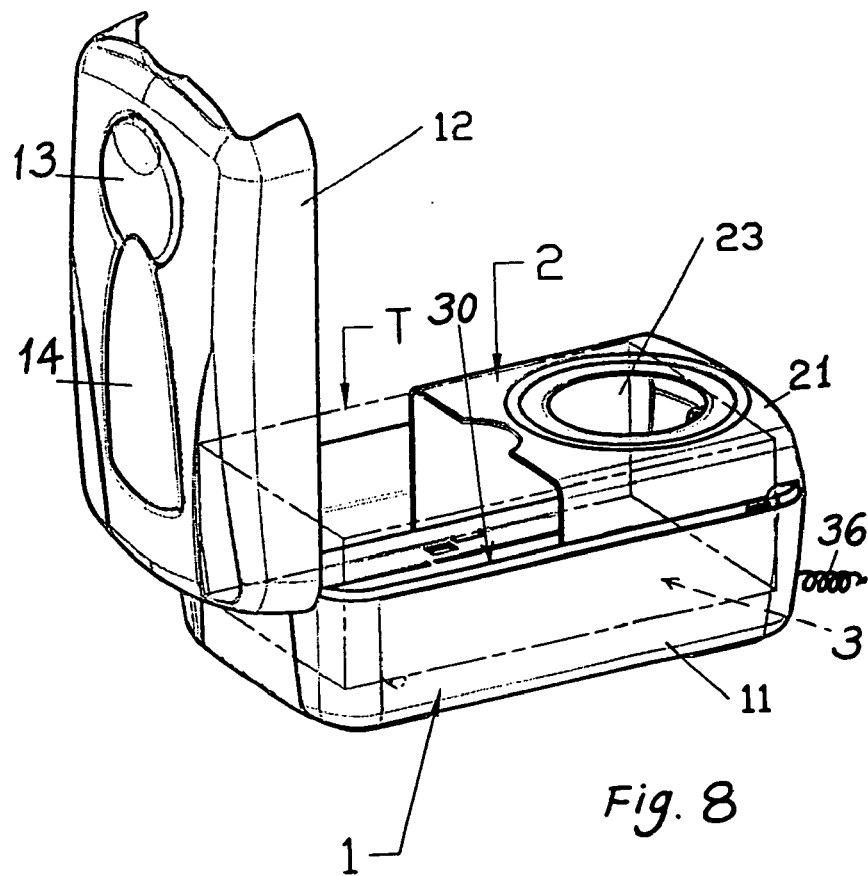
FIG. 8 shows the drawer casing retracted into the main casing of the present invention following FIG. 7.

The wiper cover 14 includes: a pair of pins 141 formed on a rear portion of the wiper cover 14 to be pivotally engaged with a pair of pin holes 123 recessed in the upper cover 12 for pivotally securing the wiper cover 14 on the upper cover 12; a first engaging portion 142 formed in a front portion of the wiper cover 14 to be engaged with a second engaging portion 127 of the actuator 13 when closed on the upper cover 12 (FIG. 5), and a cam portion 143 formed in a rear portion of the wiper cover 14 for operatively depressing a restoring spring 122 resiliently retained in the upper cover 12 when closing the wiper cover 14 on the upper cover 12; and upon unlocking by the actuator 13 to disengage the first engaging portion 142 from the second engaging portion 127, the restoring spring 122 will urge the cam portion 143 to open the wiper cover 14 as shown in FIG. 6.

For simplifying purpose, the cover 14 may be modified to be a cap (not shown) to be detachably or removably closed on or opened from the opening 121 of the upper cover 12.

The actuator 13 includes: a push button 130 having a pair of button pins 131 pivotally engaged with a pair of recesses 125 formed in the upper cover 12 for pivotally or seesawly mounting the push button 130 in a button socket 124 in the upper cover 12, a spring plate 126 resiliently retained in the button socket 124 and having a protruding portion of the spring plate 126 normally urging the push button 130 upwardly to be ready for depression when opening the wiper cover 14, and a second engaging portion 127 formed on a rear hook portion of the spring plate 126 to be engaged with the first engaging portion 142 of the wiper cover 14 when closing the wiper cover 14; whereby upon depression of the push button 130 of the actuator 13, the spring plate 126 will be depressed to disengage the second engaging portion 127 from the first engaging portion 142 to allow the restoring spring 122 to urge the wiper cover 14 upwardly for opening the upper cover 12.

The drawer casing 2 includes a rear-opened drawer 21 slidably engaged with the trough 111 in the main casing, a grip 22 formed on a front portion of the rear-opened drawer 21 for pulling the drawer casing 2 outwardly, and a top opening 23 formed in a top of the drawer 21 for placing a fluid container F (including nursing bottle N or coffee cup C, etc.) in the top opening for warming the fluid container. The bottom of the casing 2 is preferably made of heat conductive.

An annular packing member (for instance, made of rubber or flexible material) 231 may be fixed on the drawer 21 of the drawer casing 2 along the top opening 23 for sealing or partially sealing the aperture between the fluid container F and the top opening 23, and a retainer ring 232 provided for fixing the packing member 231 on the drawer 21.

The packing member 231 may be radially cut with a plurality of slits 231*s* for adjustably fastening the fluid container F with different diameters or size.

The heating device 3 as secured to a bottom of the drawer casing 2 includes: a heating element 31 secured on a board 32 which is fastened to the bottom of the drawer casing 2 through a heat-dissipating plate 34 and a warming platform 30 by screws or bolts B and by a retainer plate 33 backed under the board 32; with warming platform 30 exposed to the interior in the main casing 1.

The heating element 21 may be a PTC (positive temperature coefficient) heating thermistor or any other electric heater.

The heat-dissipating plate 34 is sandwiched between the heating element 21 formed on the board 32 and the warming platform 30 which is formed under the bottom of the drawer casing 2 for transferring the heat from the heating element 21 to the warming platform 30. The plate 34 may be made of aluminum alloy or any other heat conductive materials.

The warming platform 30 may be made of plastic materials, for example, polycarbonate or any other materials having electric resistance, but having suitable heat conductance for transferring the heat from the heating element 21 through the heat-dissipating plate 34 to the warming platform 30 having the wiper (tissue) box T placed on the warming platform 30 for warming the wiper or tissue, and for warming the fluid container in the drawer casing 2 having a bottom of the casing 2 thermally contacted with the warming platform 30.

The elements of the heating device 3 may be modified or simplified, e.g., the board 32, the plate 34 and the platform 30 may also be integrally formed for saving assembly cost.

The warming platform 30 may have a length generally equal to or slightly less then a length of the main casing 1 having the drawer casing 2 retracted into the main casing 1; while the drawer casing 2 having a length being generally about one-half of the length of the warming plate 30 or of the main casing 1, whereby upon an outward withdrawal of the drawer casing 2 from the main casing 1 as shown in dotted line of FIG. 3, there is still one-half length of the warming platform 30 remained in the interior 10 in the main casing 1 to allow a rear half portion of the warming platform 30 to transfer the heat towards the wiper or tissue as stored in the box T. Namely, even the drawer casing 2 is completely pulled outwardly, there is still a partial platform 30 which may still play the role for transferring the heat from the heating element 21 towards the tissue or wiper.

When the drawer casing 2 is pulled outwardly for warming the fluid container F as stored into the opening 23 of the drawer casing 2, the wiper box T may be supported by a resilient member S (such as an elastomer foam or a spring member, not limited in this invention) which is resiliently formed in a rear bottom portion of the main casing 1. Therefore, the box T may be stably supported on the platform 30 partially and on the resilient member S as dotted line shown in FIG. 3.

Figure 2:
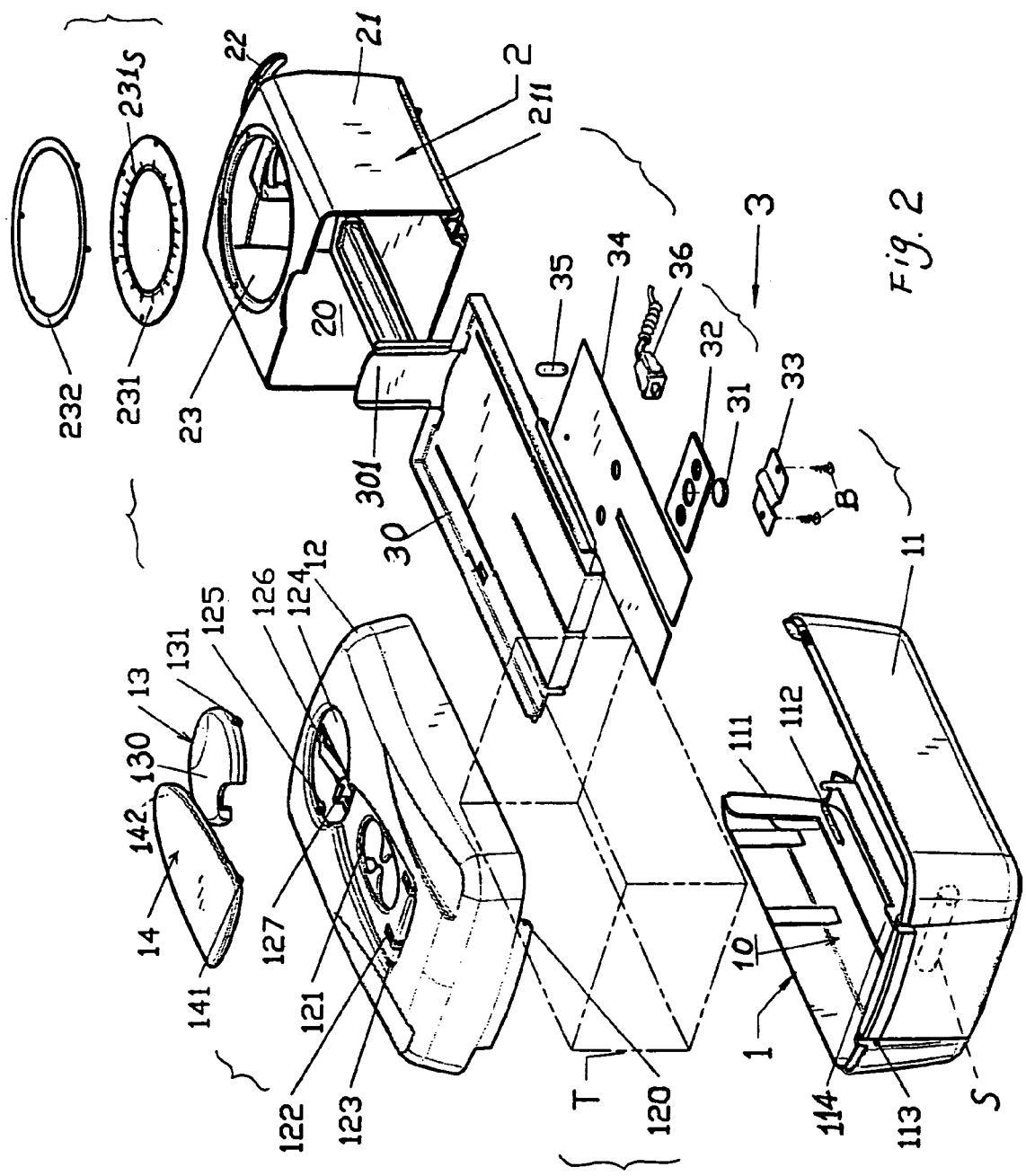
FIG. 2 is an exploded view showing the warmer of the present invention.

Naturally, the wiper or tissue box T may also be supported by side rails 114 as formed on a rear bottom portion of the main casing 1 (FIG. 2). So, the supporting devices or mechanisms for supporting the box T when outwardly pulling the drawer casing 2 from the main casing 1 are not limited in the present invention.

The heating element 31 is electrically connected to a power supply 36 including a coiled electric cord as shown in FIG. 2 for powering the heating element 31. A power indicator 35 is formed on a holder 301 protruding upwardly from the warming platform 30. The power indicator 35 may be juxtapositioned to the grip 22 of the drawer casing 2 (FIG. 3), with the grip 22 made of transparent material for a clear observation of the indicator 35 when lit to show the normal power supply of the present invention.

When the drawer casing 2 is retracted and received in the main casing 1, the wiper or tissue box T is stored in the interior 10 in the casing 1 and in the interior 20 in the drawer casing 2. The heating device 3 provided on the bottom of the casing 2 may warm the wiper box T as laid on the warming platform 30. Upon opening of the cover 14, a warming tissue or wiper will then be picked up from the opening 121 of the upper cover 12. It may provide a warm tissue which is especially comfortable for use in a cold winter season.

When it is necessary to simultaneously warm a cup of coffee in a container, for example, the drawer casing 2 is withdrawn outwardly from the main casing 1, the container as placed in the casing 2 (FIG. 1) will be warmed by the heating device 3 just formed on the bottom portion of the casing 2.

When it is not necessary to provide a hot drink, the drawer casing 2 may then be retracted into the main casing 1.

Accordingly, it is very convenient to render a warm tissue or warm drink just by a single device of the present invention. In other words, there is no need to parallelly prepare two sets of warming devices including a tissue warmer and a drink heater to thereby save cost and volume of the instruments. A warming device may warm tissue and drink simultaneously, thereby affording a comfortable, efficient and cost-saving warming device especially suitable in a cold weather or season. The present invention is therefore superior to the prior art.

The present invention may be modified without departing from the spirit and scope of the present invention. The heating device 3 may also be formed in the main casing 1. The drawer casing 2 may be further provided with a telescopic cover such as a bellows on the casing 2 for completely covering and thermally insulating the fluid container when inserted in the casing 2.

I claim:

1. A warmer comprising:
   a main casing, defining an interior for storing a wiper or tissue box therein;
   a drawer casing defining a drawer interior adapted for storing a fluid container therein and slidably and retractably engaging with said main casing; and a heating device secured to a bottom of said drawer casing for warming said drawer casing and said main casing; said heating device including a heating element secured on a board which is fastened to the bottom of the drawer casing through a heat-dissipating plate and a warming platform by screws and by a retainer plate backed under the board; said warming platform having a platform portion exposed to the interior in the main casing and having the wiper box placed on the warming platform;

whereby upon outward withdrawal of said drawer casing from said main casing, the wiper box in said main casing and the fluid container in said drawer casing will be simultaneously warmed by said heating device.

2. A warmer according to claim 1, wherein said fluid container is a nursing bottle.

3. A warmer according to claim 1, wherein said main casing includes: a lower shell slidably engaged with the drawer casing, an upper cover pivotally secured to the lower shell for combinably forming the main casing, a wiper cover pivotally secured to the upper cover, and an actuator formed on the upper cover for normally closing said wiper cover and operatively depressed for opening the wiper cover.

4. A warmer according to claim 3, wherein said lower shell of said main casing includes: a trough recessed in the lower shell for slidably engaging the drawer casing in the trough, a pair of guiding projections formed on opposite side walls of the lower shell for slidably engaging a pair of guiding grooves recessed in opposite outer walls of the drawer casing, and a pair of pivots formed on a rear wall of the lower shell for pivotally securing the upper cover on the lower shell.

5. A warmer according to claim 4, wherein said upper cover includes: a pair of pivot holes formed in a rear portion of the upper cover to be pivotally engaged with a pair of pivots formed on the lower shell for pivotally securing the upper cover to the lower shell; a wiper opening formed through the upper cover for pick up of wiper or tissue from the wiper box stored in the casing; a wiper cover pivotally secured on the upper cover for normally closing the wiper opening; and an actuator formed on the upper cover for operatively opening the wiper cover when picking up wiper or tissue from an interior in the casing.

6. A warmer according to claim 5, wherein said wiper cover includes: a pair of pins formed on a rear portion of the wiper cover to be pivotally engaged with a pair of pin holes recessed in the upper cover for pivotally securing the wiper cover on the upper cover; a first engaging portion formed in a front portion of the wiper cover to be engaged with a second engaging portion of the actuator when closed on the upper cover, and a cam portion formed in a rear portion of the wiper cover for operatively depressing a restoring spring resiliently retained in the upper cover when closing the wiper cover on the upper cover.

7. A warmer according to claim 5, wherein said actuator includes: a push button having a pair of button pins pivotally engaged with a pair of recesses formed in the upper cover for pivotally mounting the push button in a button socket in the upper cover, a spring plate resiliently retained in the button socket and having a protruding portion of said spring plate normally urging the push button upwardly to be ready for depression when opening the wiper cover, and a second engaging portion formed on a rear hook portion of the spring plate to be engaged with a first engaging portion of the wiper cover when closing the wiper cover; whereby upon depression of the push button of the actuator, the spring plate will be depressed to disengage the second engaging portion from the first engaging portion to allow a restoring spring to urge the wiper cover upwardly for opening the upper cover.

8. A warmer according to claim 4, wherein said drawer casing includes a rear-opened drawer slidably engaged with the trough in the main casing, a grip formed on a front portion of the rear-opened drawer for pulling the drawer casing outwardly, and a top opening formed in a top of the drawer for placing a fluid container in the top opening for warming the fluid container.

9. A warmer according to claim 8, wherein said drawer casing includes an annular packing member fixed on the drawer of the drawer casing along the top opening for sealing an aperture between the fluid container and the top opening, and a retainer ring provided for fixing the packing member on the drawer.

10. A warmer according to claim 9, wherein said packing member is radially cut with a plurality of slits for adjustably fastening the fluid container with different diameters or size.

11. A warmer according to claim 1, wherein said heating element is a PTC (positive temperature coefficient) heating thermistor.

12. A warmer according to claim 1, wherein said heat-dissipating plate is sandwiched between the heating element formed on the board and the warming platform which is formed under the bottom of the drawer casing for transferring the heat from the heating element to the warming platform.

13. A warmer according to claim 1, wherein said warming platform and the bottom of the drawer casing are made of thermally conductive material to transfer heat from the warming platform to the drawer casing for warming a fluid container placed in said drawer casing.

14. A warmer according to claim 1, wherein said warming platform has a length generally equal to a length of the main casing with the drawer casing operatively retracted into the main casing; and the drawer casing having a length generally equal to one half of the length of the warming plate or the main casing, whereby upon an outward withdrawal of the drawer casing from the main casing, an one-half length of the warming platform is remained in the interior in the main casing to allow a rear portion of the warming platform to transfer heat towards the wiper box.

15. A warmer according to claim 1, wherein said main casing includes means formed in a rear bottom portion of the main casing for stably supporting a wiper box in cooperation with the warming platform.

16. A warmer according to claim 1, wherein said drawer casing includes a telescopic cover formed thereon for covering the fluid container inserted in said drawer casing.

* * * * *